US008692911B2

(12) United States Patent
Kanemitsu et al.

(10) Patent No.: US 8,692,911 B2
(45) Date of Patent: Apr. 8, 2014

(54) IMAGE PROCESSING DEVICE, IMAGE PROCESSING METHOD, AND CAMERA MODULE

(75) Inventors: Shiroshi Kanemitsu, Kanagawa (JP); Takaaki Kawakami, Kanagawa (JP); Kazuhiro Tabuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 13/597,646

(22) Filed: Aug. 29, 2012

(65) Prior Publication Data
US 2013/0194459 A1    Aug. 1, 2013

(30) Foreign Application Priority Data
Jan. 31, 2012   (JP) ................................ 2012-018122

(51) Int. Cl.
*H04N 9/64*    (2006.01)
*G06K 9/40*    (2006.01)
*H04N 5/14*    (2006.01)
*G06T 7/00*    (2006.01)

(52) U.S. Cl.
CPC .............. *H04N 5/142* (2013.01); *G06T 7/0085* (2013.01); *G06T 2207/20192* (2013.01)
USPC ......................................... 348/253; 382/266

(58) Field of Classification Search
CPC ..... H04N 5/217; H04N 5/2622; H04N 5/142; G06T 7/0085; G06T 2207/20192
USPC ................... 348/252, 253, 625, 627; 382/266
See application file for complete search history.

(56) References Cited

U.S. PATENT DOCUMENTS

| 5,729,360 | A | 3/1998 | Kita et al. | |
| 7,260,267 | B2* | 8/2007 | Sugimoto | 382/266 |
| 8,134,646 | B2* | 3/2012 | Miyazawa | 348/625 |
| 2005/0200760 | A1* | 9/2005 | Nakakuki | 348/623 |
| 2005/0249430 | A1* | 11/2005 | Lim | 382/266 |
| 2007/0002152 | A1* | 1/2007 | Fujiwara | 348/252 |
| 2009/0016635 | A1* | 1/2009 | Takayama | 382/266 |
| 2010/0166308 | A1* | 7/2010 | Honda | 382/168 |
| 2011/0188774 | A1* | 8/2011 | Song et al. | 382/266 |

FOREIGN PATENT DOCUMENTS

| JP | 7-212611 | | 8/1995 |
| JP | 11046312 | A * | 2/1999 |
| JP | 2000059651 | A * | 2/2000 |
| JP | 2000209463 | A * | 7/2000 |
| JP | 2001136413 | A * | 5/2001 |
| JP | 2001346069 | A * | 12/2001 |
| JP | 2002077667 | A * | 3/2002 |
| JP | 2004-159148 | | 6/2004 |
| JP | 2005-286411 | | 10/2005 |
| JP | 2006279812 | A * | 10/2006 |

* cited by examiner

*Primary Examiner* — John Villecco
(74) *Attorney, Agent, or Firm* — Oblon, Spivak, McClelland, Maier & Neustadt, L.L.P.

(57) ABSTRACT

According to one embodiment, an image processing device includes an edge enhancement unit and a brightness level determination unit. The edge enhancement unit performs an edge enhancement process by adding extraction data which has been subjected to a noise cancellation process and an amplitude limitation process to a brightness signal. The brightness level determination unit determines a height of the signal level of the brightness signal. The edge enhancement unit adjusts the signal level of the extraction data added to the brightness signal depending on a determination result of the brightness level determination unit.

20 Claims, 11 Drawing Sheets

IMAGE PROCESSING DEVICE, IMAGE PROCESSING METHOD, AND CAMERA MODULE

CROSS-REFERENCE TO RELATED APPLICATIONS

This application is based upon and claims the benefit of priority from Japanese Patent Application No. 2012-018122, filed on Jan. 31, 2012; the entire contents of all of which are incorporated herein by reference.

FIELD

Embodiments disclosed herein relate generally to an image processing device, an image processing method, and a camera module.

BACKGROUND

In recent years, for the reduction in cost and thickness of a camera module which is mounted on a mobile terminal, the number of lenses is decreased and lenses having a low MTF (modulation transfer function) characteristic are employed. In order to cover the insufficient focusing due to the low MTF, for example, an edge correction (an edge enhancement process) is performed through a digital signal process. In general, the edge enhancement process is performed such that a predetermined band of edge components extracted by a bandpass filter (BPF) is subjected to a predetermined process and edge portions are added with an overshoot effect or an undershoot effect.

Particularly, in a case of an image having a low signal-to-noise ratio (SNR), noise components are extracted along with the edge components and are added to the edge portions, so that the SNR of the obtained image is degraded further more. The degradation in the SNR is dealt with by adding a noise cancelling function to the extracted edge component. The noise cancelling function also causes the decrease of the edge components as well as the noise components. For this reason, with the application of the noise cancelling function, resolution may be lowered under a desired level.

Since the amplitudes of the edge components are large in a bright part and small in a dark part, a necessary level of edge enhancement varies according to light and dart. Regarding an image containing the bright part and the dark part as well, it is preferable that the edge enhancement process be strongly performed with respect to the bright part but weakly to the dark part. In addition, the edge in the bright part is subjected to an amplitude limitation process of clipping the edge enhancement on a desired level in order to keep a balance at the level of the edge enhancement.

In a case where the balance at the level of the edge enhancement takes priority, the level for limiting the edge enhancement is set to be low, so that the edge enhancement is insufficiently made. In this regard, actions can be taken to increase the level of the edge enhancement by multiplying the edge component after the amplitude limitation process by a gain. In this case, the noise contained in the edge components which are extracted from the dark part is amplified as well. On the contrary, in a case where the limiting level of the edge enhancement is set too high, the balance at the level of the edge will be lost. In this way, according to the related art, the effective adjustment for the edge enhancement and the noise suppression may be difficult.

DETAILED DESCRIPTION

In general, according to one embodiment, an image processing device includes a data extraction unit, a noise cancellation unit, an amplitude limitation unit, an edge enhancement unit, and a brightness level determination unit. The data extraction unit performs data extraction according to a signal level from an image signal which is acquired by capturing an object image. The noise cancellation unit performs a noise cancellation process on extraction data which is extracted by the data extraction unit. The amplitude limitation unit performs an amplitude limitation process on the extraction data. The edge enhancement unit performs an edge enhancement process on the brightness signal by adding the extraction data which has been subjected to the noise cancellation process and the amplitude limitation process to a brightness signal which is obtained from the image signal. The brightness level determination unit determines the height of the signal level of the brightness signal. The edge enhancement unit adjusts the signal level of the extraction data which is added to the brightness signal depending on a determination result of the brightness level determination unit.

Hereinafter, the image processing device, an image processing method, and a camera module according to embodiments will be described in detail referring to the accompanying drawings. Further, the invention is not limited to these embodiments.

Figure 1:
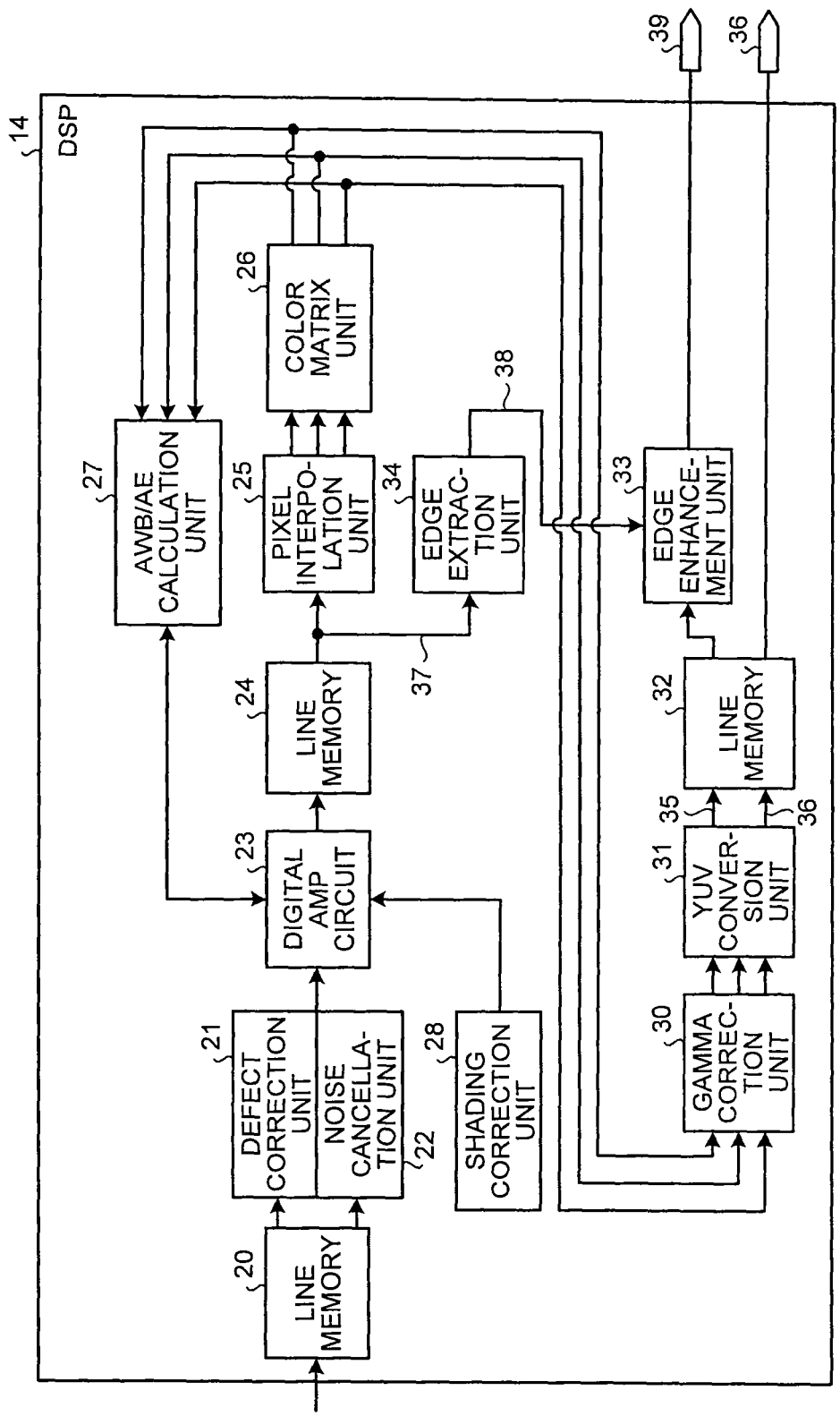
FIG. 1 a block diagram illustrating a schematic configuration of a DSP serving as an image processing device according to a first embodiment.
Figure 2:
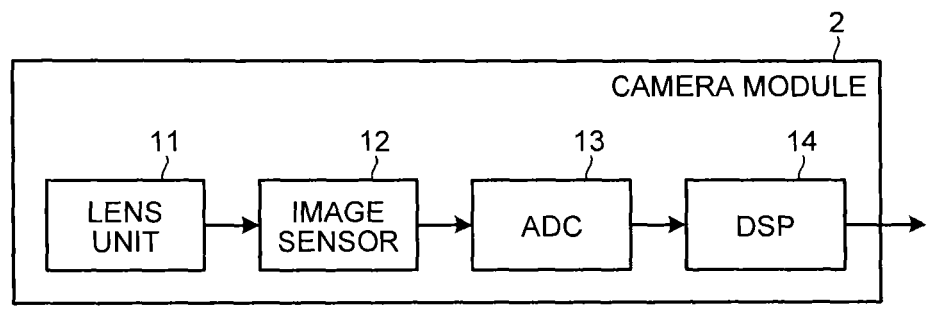
FIG. 2 a block diagram illustrating a schematic configuration of a camera module provided with the DSP illustrated in FIG. 1.
Figure 3:
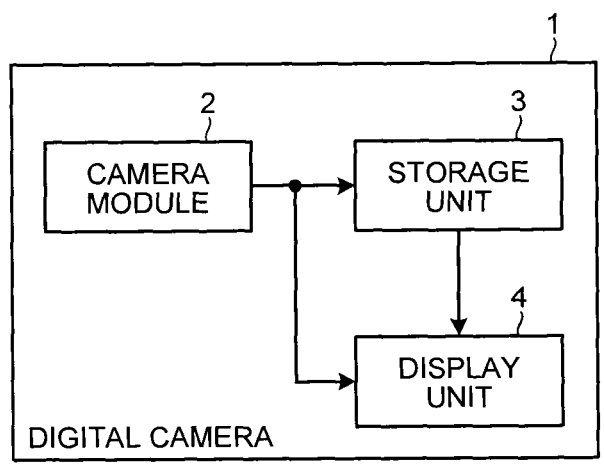
FIG. 3 a block diagram illustrating a schematic configuration of a digital camera provided with the camera module illustrated in FIG. 2.

FIG. 1 is a block diagram illustrating a schematic configuration of a digital signal processor (DSP) serving as an image processing device according to a first embodiment. FIG. 2 is a block diagram illustrating a schematic configuration of a camera module which is provided with the DSP illustrated in FIG. 1. FIG. 3 is a block diagram illustrating a schematic configuration of a digital camera which is provided with the camera module illustrated in FIG. 2. The camera module 2 is used in an electronic apparatus, for example, a camera-equipped mobile terminal or the like in addition to a digital camera 1.

The digital camera 1 includes the camera module 2, a storage unit 3, and a display unit 4. The camera module 2 captures the object image. The storage unit 3 stores the image which is captured by the camera module 2. The display unit 4 displays the image which is captured by the camera module 2. The display unit 4, for example, is a liquid crystal display.

The camera module 2 captures the object image and then outputs the image signal to the storage unit 3 and the display unit 4. The storage unit 3 outputs the image signal to the display unit 4 in response to operations of a user. The display unit 4 displays an image according to the image signal which is received from the camera module 2 or the storage unit 3.

The camera module 2 includes a lens unit 11, an image sensor 12, an analog to digital converter (ADC) 13, and a DSP 14. The lens unit 11 receives light from an object and forms the object image using the image sensor 12. The image sensor 12 converts the light received through the lens unit 11 into signal charges and captures the object image.

The image sensor 12 receives signal values of R (red), G (green), and B (blue) in an order corresponding to a Bayer array so as to generate an analog image signal. The ADC 13 converts the analog image signal of the image sensor 12 into a digital image signal. The DSP 14 performs various kinds of image processing with respect to the digital image signal of the ADC 13.

A line memory 20 temporarily stores the digital image signal which is received from the ADC 13 to the DSP 14. A defect correction unit 21 and a noise cancellation unit 22 use the line memory 20 together. The defect correction unit 21 performs defect correction on the digital image signal from the line memory 20. The defect correction unit 21 corrects an absent portion (defect) of the digital image signal caused by a malfunctioning pixel in the image sensor 12. The noise cancellation unit 22 performs the noise cancellation process of reducing a noise. A shading correction unit 28 calculates a shading correction coefficient for performing shading correction on the object image.

A digital amplifier (AMP) circuit 23 calculates a digital AMP coefficient based on a coefficient calculated by an AWB/AE calculation unit 27 to be described later and the shading correction coefficient calculated by the shading correction unit 28. In addition, the digital AMP circuit 23 multiplies the digital image signal which has been subjected to the processes of the defect correction unit 21 and the noise cancellation unit 22 by the digital AMP coefficient.

A line memory 24 temporarily stores the digital image signal which has been multiplied by the digital AMP coefficient. A pixel interpolation unit 25 generates RGB signals (sensitivity signals) through an interpolation process (de-mosaic process) of the digital image signals which are transferred from the line memory 24 in an order of the Bayer array. A color matrix unit 26 performs a color matrix calculation process (a color reproducibility process) on the sensitivity signals of the RGB in order to obtain the color reproducibility. The AWB/AE calculation unit 27 calculates respective coefficients for an auto white balance (AWB) adjustment and an auto exposure (AE) adjustment based on the sensitivity signals of the RGB.

A gamma correction unit 30 performs a gamma correction on the sensitivity signals of the RGB in order to correct a gradation of the image. A YUV conversion unit 31 generates a brightness (Y) signal 35 and a color-difference (UV) signal 36 based on the sensitivity signals of the RGB, and thus converts the RGB-format image signals into the YUV-format image signals (for example, YUV422 or the like). The YUV conversion unit 31 converts the sensitivity signal of each color component into the Y signal 35 and the UV signal 36. A line memory 32 temporarily stores the Y signal 35 and the UV signal 36 output from the YUV conversion unit 31.

An edge enhancement unit 33 performs the edge enhancement process on the Y signal 35 which is read out of the line memory 32. When performing the edge enhancement process, the edge enhancement unit 33, for example, uses a correction coefficient which is calculated based on the capturing conditions and the positions of the respective pixels of the image sensor 12. Furthermore, as an example of the edge enhancement process, the edge enhancement unit 33 adds extraction data 38 received from an edge extraction unit 34 to the Y signal 35.

The edge extraction unit 34 performs edge extraction on RAW image data 37 which is read out of the line memory 24, and outputs the extraction data 38. The RAW image data 37 is an image signal which has been transferred to reach out to the edge extraction unit 34 while being subjected to signal processing in each unit after being acquired by capturing the object image in the image sensor 12 (see FIG. 2).

The DSP 14 outputs the Y signal 39 which has been subjected to the edge enhancement process of the edge enhancement unit 33 and the UV signal 36 output from the line memory 32. Further, a configuration of the DSP 14 described in the embodiment is an example, which may be appropriately modified. For example, changes in the configuration of the DSP 14 may be made through additions of other elements separately from those illustrated in the embodiments, or omissions of some removable elements.

Figure 4:
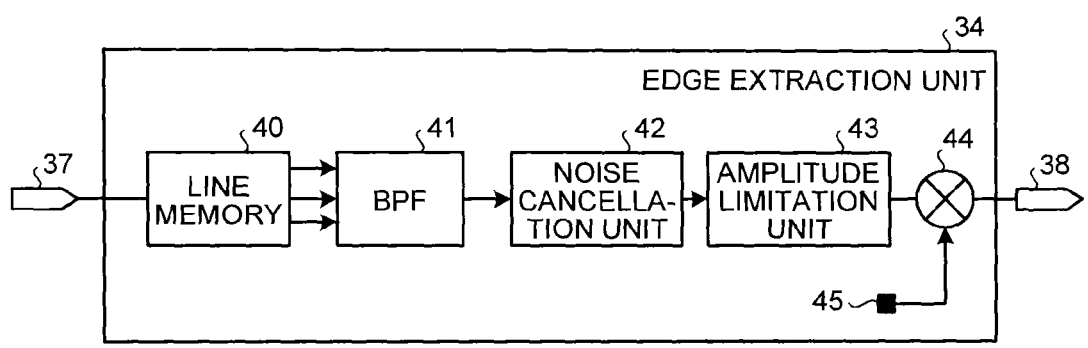
FIG. 4 a block diagram illustrating a configuration of an edge extraction unit.

FIG. 4 is a block diagram illustrating a configuration of the edge extraction unit. The edge extraction unit 34 includes a line memory 40, a bandpass filter (BPF) 41, a noise cancellation unit 42, an amplitude limitation unit 43, and a multiplier 44.

The line memory 40 temporarily stores the RAW image data 37 which is received from the line memory 24 (see FIG. 1) to the edge extraction unit 34. The BPF 41 extracts a predetermined band of data from the RAW image data 37 which is read out of the line memory 40 so as to filter out the data containing an edge component. The BPF 41 serves as the data extraction unit which extracts data from the image data acquired by capturing the object image, according to the signal level. The BPF 41 outputs the extraction data which is extracted from the RAW image data 37.

The noise cancellation unit 42 performs the noise cancellation process on the extraction data which is extracted by the BPF 41. The noise cancellation unit 42 considers data at the signal level not more than the noise cancelling threshold value as the noise component, and subtracts a predetermined noise cancelling threshold value from the signal level of the extraction data, so that the noise component is deleted. The noise cancelling threshold value is a threshold value which is set for the noise cancellation process in advance.

The amplitude limitation unit 43 performs the amplitude limitation process on the extraction data which has been subjected to the noise cancellation process of the noise cancellation unit 42. The amplitude limitation unit 43 adjusts the data at the signal level exceeding a predetermined amplitude limit width in the extraction data to fall within the amplitude limit level, so that a level of edge enhancement is uniformalized. The amplitude limit width is designed to be a setting value which is previously set for the amplitude limitation process.

The multiplier 44 multiplies the extraction data which has been subjected to the amplitude limitation process of the amplitude limitation unit 43, for example, by a pre-set amplitude adjusting gain 45. The multiplier 44 serves as an amplitude adjusting unit which performs amplitude adjustment on the extraction data subjected to the amplitude limitation process in the amplitude limitation unit 43. The amplitude adjusting gain 45 is designed to be a gain used for the amplitude adjustment in the amplitude adjusting unit. The edge extraction unit 34 outputs the extraction data 38 which has been subjected to the multiplication of the amplitude adjusting gain 45 in the multiplier 44.

FIGS. 5 to 10 are diagrams for explaining the outline of the edge extraction performed by the edge extraction unit. In the drawings, the vertical axis represents the signal level of the extraction data, and the horizontal axis represents positions on an image. In the drawings, solid bar graphs represent the edge components existing in the image, and dashed bar graphs represent the noise components existing in an edge portion.

Figure 5:
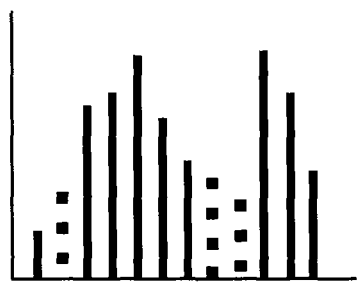
FIGS. 5 to 10 are diagrams for explaining an outline of edge extraction performed by an edge extraction unit.

For example, the extraction data having a distribution illustrated in FIG. 5 will be acquired through the data extraction in the BPF 41. The extraction data includes the edge component and the noise component. The noise cancellation unit 42 performs the noise cancellation process on the extraction data, as illustrated in the upper portion of FIG. 6, in which the noise cancelling threshold value is set to Th1.

Figure 6:
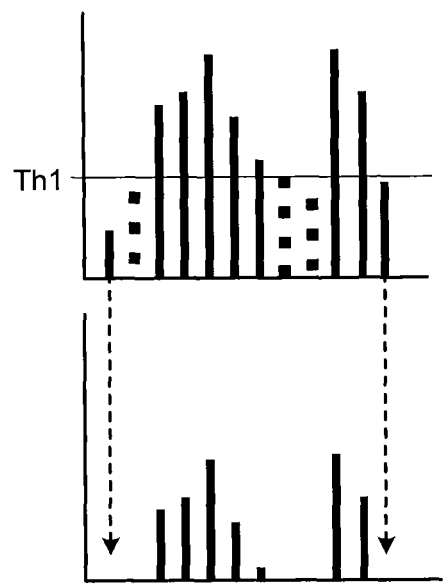

In a case where an edge component at a level less than Th1 is included in the extraction data before the noise cancellation process, the edge component will be deleted along with the noise component as illustrated in the lower portion of FIG. 6. As the noise cancelling threshold value becomes a lower value, many edge components at a low level can be left, and on the other hands, many noise components are likely to be left as well.

Figure 7:
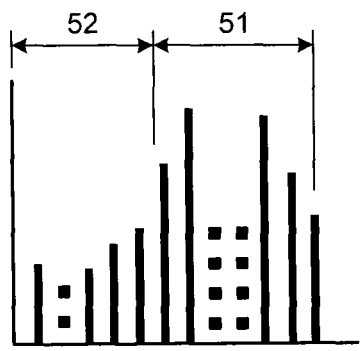

In addition, for example, the extraction data having a distribution illustrated in FIG. 7 will be acquired through the data extraction in the BPF 41. The extraction data includes the edge component and the noise component. In the example illustrated in FIG. 7, a bright part and a dark part of the image appear on the image with a relatively definitive separation. Data 51 is assumed as data acquired from the bright part of the image. Data 52 is assumed as data acquired from the dark part of the image.

In the example, when the signal levels of the noise components are compared in both the data 51 of the bright part and the data 52 of the dark part, it can be seen that the bright part includes the noise component of a signal level higher than that of the noise component included in the dark part. In this case, since the dark part has a high ratio of the signal level of the noise component relative to the signal level of the edge component compared with that of the bright part, the noise generated in the edge portion of the dark part becomes noticeable more than the noise generated in the edge portion of the bright part.

Figure 8:
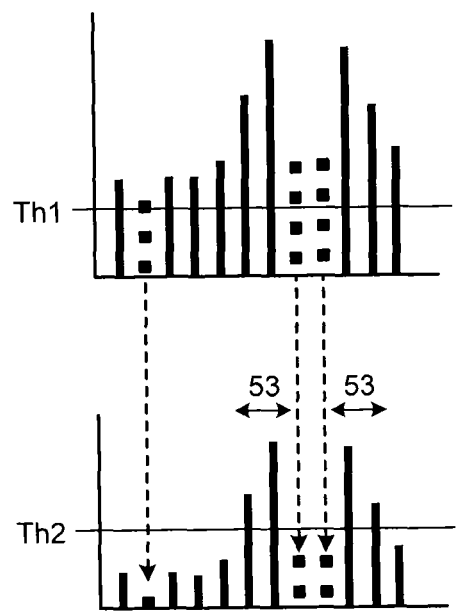

As illustrated in the upper portion of FIG. 8, the noise cancellation unit 42 performs the noise cancellation process on the extraction data, in which the noise cancelling threshold value is set to Th1. In the example, the extraction data before the noise cancellation process includes the noise components equal to or greater than Th1. For this reason, as illustrated in the lower portion of FIG. 8, the noise components are left in the extraction data after the noise cancellation process. In this case, regarding both the bright part and the dark part, since the signal level of the noise component is low enough with respect to the signal level of the edge component, it is possible to make the left noise component unnoticeable.

As illustrated in the lower portion of FIG. 8, the noise is reduced in the extraction data after the noise cancellation process, and on the other hand, a significant deviation in the signal level occurs in the edge portion 53 of the bright part. Herein, in order to keep a balance at the level of the edge enhancement, the amplitude limitation process is performed in which the edge enhancement is clipped on a desired level.

Figure 9:
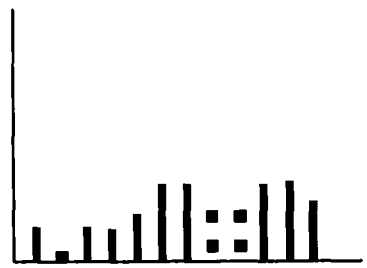
Figure 10:

For example, as illustrated in the lower portion of FIG. 8, it is assumed that the amplitude limitation unit 43 performs the amplitude limitation process in which the amplitude limit width is set to Th2. As illustrated in FIG. 9, the unbalance at the signal level in the edge portion 53 can be alleviated in the extraction data after the amplitude limitation process, and on the other hand, the level of the edge enhancement becomes insufficient. Herein, the multiplier 44 multiplies the extraction data after the amplitude limitation process by the amplitude adjusting gain 45 so as to uniformly amplify the level of the extraction data as illustrated in FIG. 10.

The sufficient edge enhancement can be made in the bright part and the dark part through the amplitude adjustment, and on the other hand, the level of the noise component is also amplified. As the amplitude limit width in the amplitude limitation process is widened, the signal level of the edge component can be made higher against the noise component, and on the other hand, the unbalance at the signal level in the edge is likely to be left.

In the embodiment, the DSP 14 adjusts the extraction data 38 output from the edge extraction unit 34 according to the Y signal 35 and then adds the adjusted extraction data to the Y signal 35, in order to prevent the effective adjustment for the edge enhancement and the noise suppression from being performed with difficulty.

Figure 11:
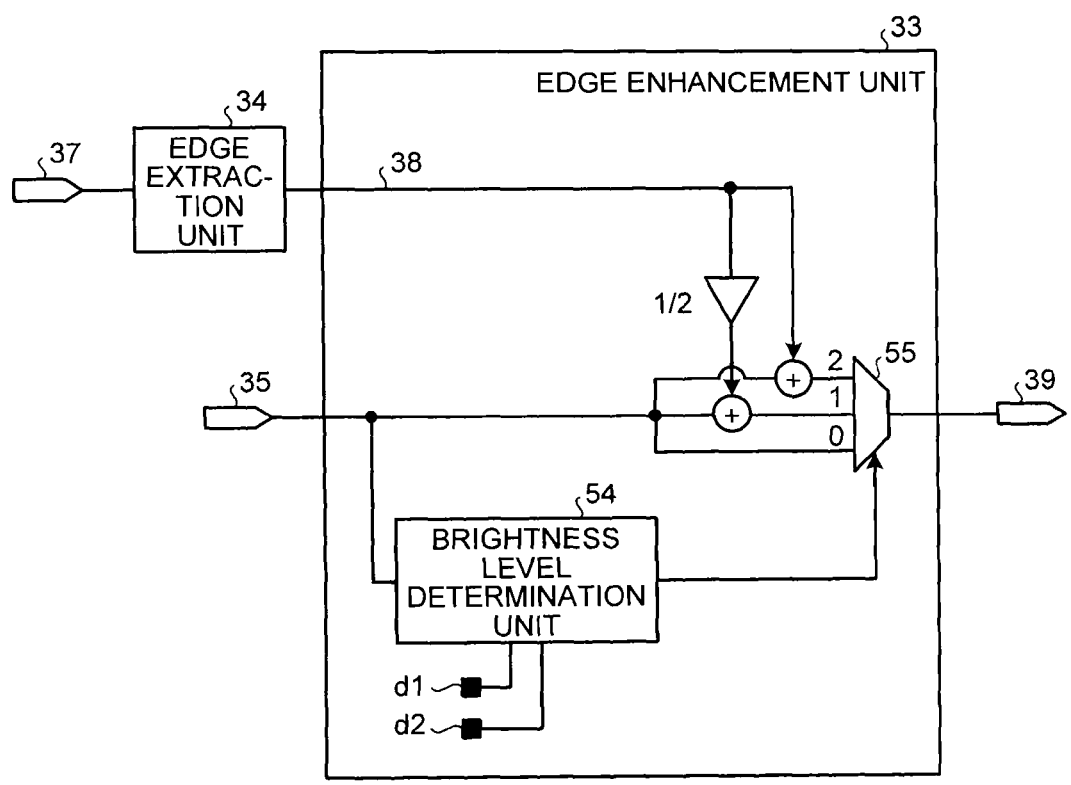
FIG. 11 is a block diagram illustrating a configuration of an edge enhancement unit.

FIG. 11 is a block diagram illustrating a configuration of the edge enhancement unit. The edge enhancement unit 33 includes a brightness level determination unit 54 and a selector 55. The brightness level determination unit 54 determines the height of the signal level of the Y signal 35 through the comparison of brightness level determination threshold values d1 and d2 (assuming d1<d2) with the signal level of the Y signal 35. For example, the edge enhancement unit 33 holds the pre-set brightness level determination threshold values d1 and d2. The selector 55 selects one of the Y signals 35 to which the extraction data 38 adjusted to be in different levels is added, depending on a determination result in the brightness level determination unit 54.

The brightness level determination threshold value d2 is assumed as, for example, a brightness level at which the sufficient level of the edge component against the noise component is easily extractable by the edge extraction of a typical scheme. The brightness level determination threshold value d1 is assumed as, for example, the brightness level at which the extraction data 38 is preferably not added to the Y signal 35 from the viewpoint of securing the SNR since the noise component is remarkably exhibited with respect to the edge component in the edge extraction of the typical scheme.

The edge enhancement unit 33 receives the extraction data 38 which has been subjected to the data extraction, the noise cancellation process, the amplitude limitation process, and the amplitude adjustment in the edge extraction unit 34, and the Y signal 35 which is read out of the line memory 32 (see FIG. 1).

In a case where the signal level of the Y signal 35 input to the edge enhancement unit 33 is less than d1, the brightness level determination unit 54 outputs a signal, for example, "0", representing the determination result. In a case where the signal level of the Y signal 35 is equal to or higher than d1 and less than d2, the brightness level determination unit 54 outputs a signal, for example, "1", representing the determination result. In a case where the signal level of the Y signal 35 is equal to or higher than d2, the brightness level determination unit 54 outputs a signal, for example, "2", representing the determination result.

In a case where the signal "2" is received from the brightness level determination unit 54, the selector 55 selects the Y signal 35 to which the extraction data 38 subjected to no adjustment in the signal level is added. In a case where the signal "1" is received from the brightness level determination unit 54, the selector 55 selects the Y signal 35 to which the extraction data 38 subjected to the multiplication of the coefficient A (assuming 0<A<1) is added. The coefficient A, for example, is set to ½.

In a case where the signal "0" is received from the brightness level determination unit 54, the selector 55 selects the Y signal 35 which has not been subjected to the addition of the extraction data 38. The edge enhancement unit 33 outputs data selected by the selector 55 as the Y signal 39. In the example, the edge enhancement unit 33 adjusts the signal level of the extraction data 38, which is added to the Y signal 35, to be 1, ½, or 0 times depending on the determination result of the brightness level determination unit 54.

Figure 12:
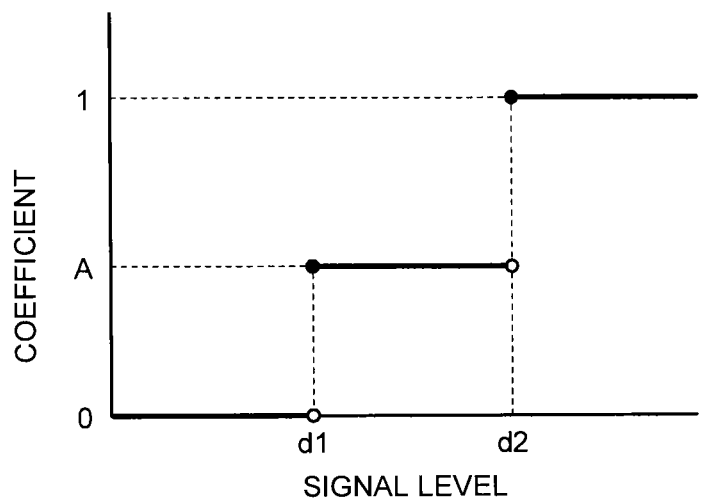
FIG. 12 is a diagram for explaining the adjustment at a signal level of extraction data which is added in an edge enhancement unit.

FIG. 12 is a diagram for explaining the adjustment in the signal level of the extraction data which is added in the edge enhancement unit. In a case where the signal level of the Y signal 35 is less than d1, the edge enhancement unit 33 stops the addition of the extraction data 38 to the Y signal 35. In other words, the edge enhancement unit 33 selects a zero value as a coefficient for adjusting the extraction data 38 which is an addition target with respect to the Y signal 35. The edge enhancement unit 33 stops the addition of the extraction data 38 for the edge portion of the dark part in which the degradation in the SNR is expected in the image compared with the effect of the edge enhancement, so that the degradation in the SNR is prevented.

In a case where the signal level of the Y signal 35 is equal to or higher than d1 and less than d2, the edge enhancement unit 33 selects the coefficient A satisfying 0<A<1 as a coefficient for adjusting the extraction data 38 which is the addition target with respect to the Y signal 35. In a case of the brightness level equal to or higher than d1 and less than d2, a minute level of the edge component may be present in the extraction data 38 and the noise component may also be left. As in this case, the edge enhancement unit 33 adds the extraction data 38 decreased at a predetermined ratio to the Y signal 35 with respect to a portion having a middle-level brightness in the image, so that the degradation in the SNR is prevented while keeping the effect of the edge enhancement. Further, the coefficient A is not limited to the case of ½, but may have any value satisfying 0<A<1.

In a case where the signal level of the Y signal 35 is equal to or higher than d2, the edge enhancement unit 33 adds an unchanged extraction data 38, that is, the coefficient of 1, to the Y signal 35. The edge enhancement unit 33 adds the unchanged extraction data 38 output from the edge extraction unit 34 to the Y signal 35 with respect to the edge portion of the bright part having less fear of the degradation in the SNR in the image, so that the sufficient edge enhancement can be made.

As described above, the DSP 14 adjusts the signal level of the extraction data 38 according to the height of the brightness level and adds the adjusted extraction data 38 to the Y signal 35, so that the edge enhancement and the noise suppression can be effectively performed and a high-quality image can be obtained.

The coefficient A satisfying 0<A<1 is not limited to the case of a constant value. The coefficient A, for example, may be changed in conjunction with an analog gain which is used for capturing an object image in the image sensor 12 (see FIG. 2).

Figure 13:
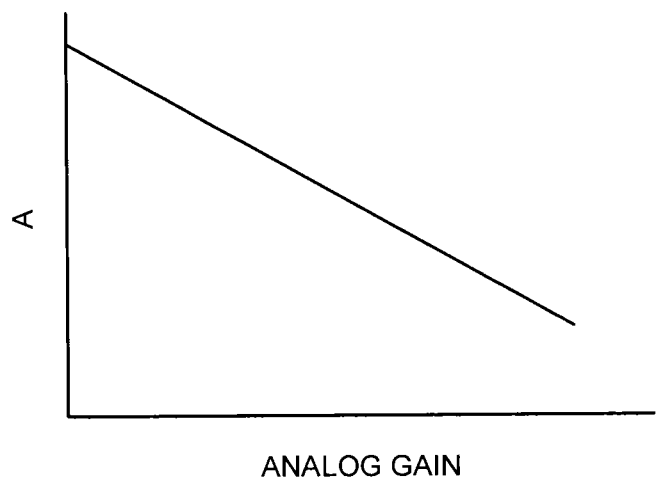
FIG. 13 is a diagram for explaining an example in which a coefficient for adjusting the extraction data is changed in conjunction with an analog gain.

FIG. 13 is a diagram for explaining an example in which the coefficient for adjusting the extraction data is changed in conjunction with an analog gain. The edge enhancement unit 33 changes the coefficient A such that the coefficient A becomes smaller as the analog gain becomes greater. The edge enhancement unit 33 changes the coefficient A assuming that the analog gain and the coefficient A, for example, are in a relation of linear functions. The edge enhancement unit 33 may change the coefficient A assuming that the analog gain and the coefficient A are in a relation of non-linear functions.

Since the coefficient A is set to a small value as the brightness at the time of capturing becomes smaller and the analog gain becomes greater, the edge enhancement unit 33 decreases an addition amount of the extraction data 38 to the Y signal 35, and thus the degradation in the SNR is effectively prevented. On the contrary, since the coefficient A is set to a high value as the brightness at the time of capturing becomes greater and the analog gain becomes smaller, the edge enhancement unit 33 increases the addition amount of the extraction data 38 to the Y signal 35, and thus the edge enhancement is effectively made. In this way, the DSP 14 can optimally realize the edge enhancement and the noise suppression depending on the brightness at the time of capturing.

As illustrated in FIG. 12, the edge enhancement unit 33 adjusts the signal level of the extraction data 38 at three different stages based on both the brightness level determination threshold values d1 and d2. The edge enhancement unit 33 may adjust the signal level of the extraction data 38 in more detail according to the height of the brightness level. The configuration of the edge enhancement unit 33 may be appropriately changed as long as the signal level of the extraction data 38 can be adjusted according to the height of the brightness level.

The brightness level determination unit 54 is not limited to the case of being assembled in the edge enhancement unit 33. The brightness level determination unit 54, for example, may be configured to be assembled in the edge extraction unit 34. The DSP 14 may include the brightness level determination unit 54 in neither the edge enhancement unit 33 nor the edge extraction unit 34.

The edge extraction unit 34 is not limited to the case of performing the edge extraction using the RAW image data 37 before the de-mosaic process. The DSP 14 may perform the edge extraction using the sensitivity signal of the RGB after the de-mosaic process or using the Y signal 35.

Figure 14:
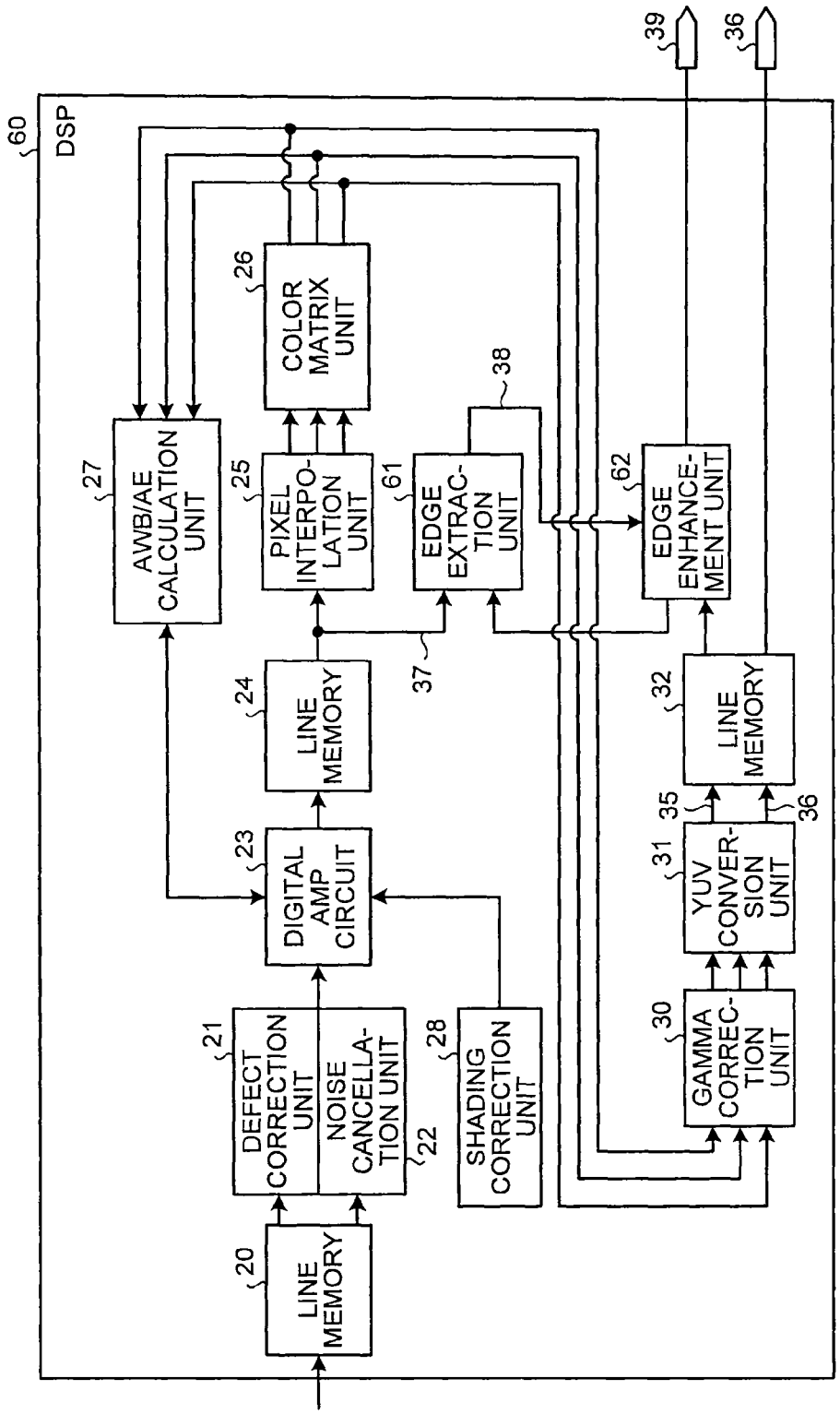
FIG. 14 is a block diagram illustrating a schematic configuration of a DSP serving as an image processing device according to a second embodiment.
Figure 15:
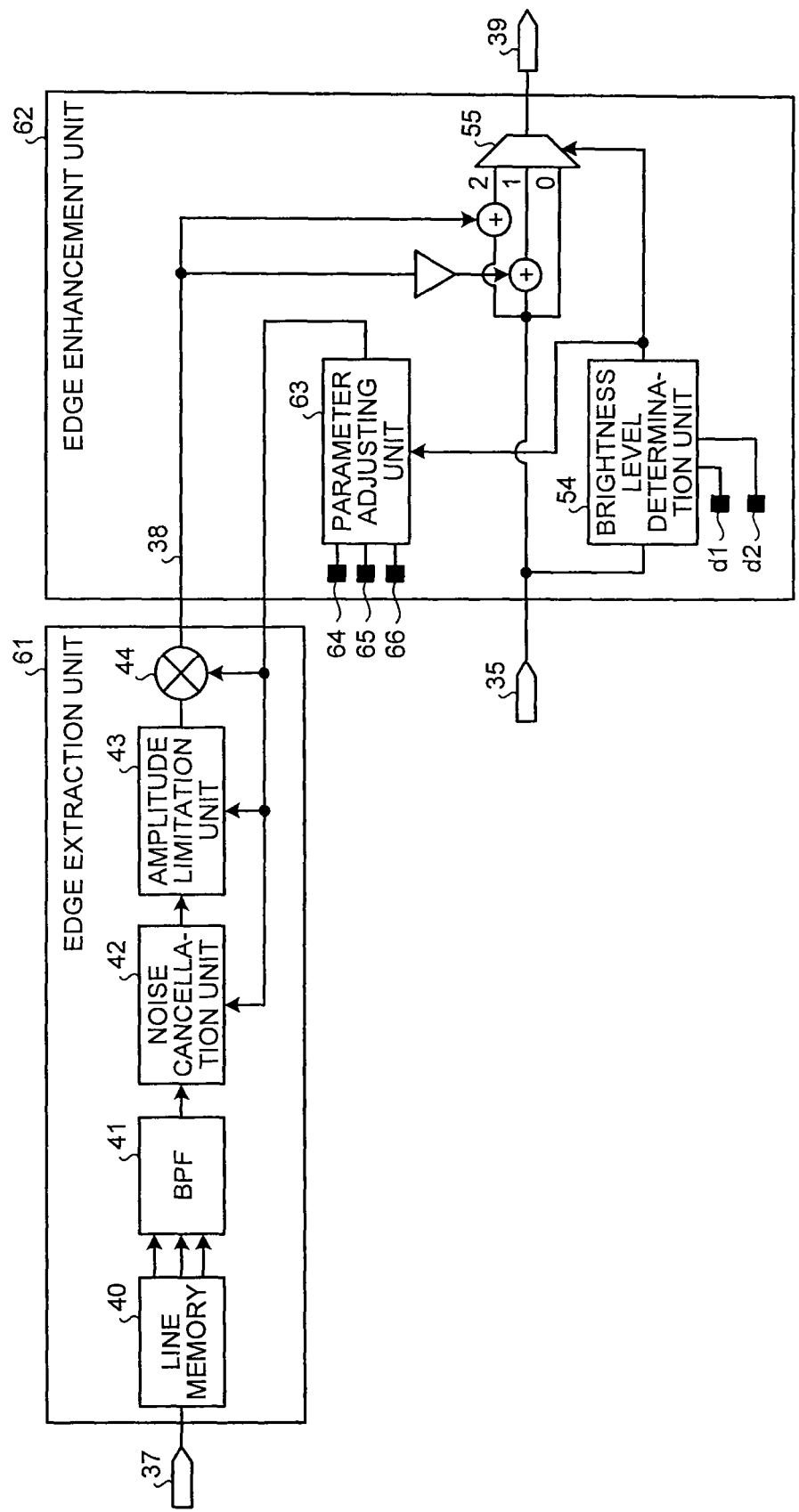
FIG. 15 is a block diagram illustrating configurations of an edge extraction unit and an edge enhancement unit, which are included in the DSP illustrated in FIG. 14.

FIG. 14 is a block diagram illustrating a schematic configuration of a DSP serving as an image processing device according to a second embodiment. FIG. 15 is a block diagram illustrating configurations of an edge extraction unit and an edge enhancement unit, which are included in the DSP illustrated in FIG. 14. The same components as those of the first embodiment are denoted by the same reference numerals, and the redundant descriptions will not be repeated. A DSP 60 according to the embodiment is provided with the same configuration as that of the DSP 14 (see FIG. 1) according to the first embodiment excepting an edge extraction unit 61 and an edge enhancement unit 62.

The edge extraction unit 61 includes the line memory 40, the bandpass filter (BPF) 41, the noise cancellation unit 42, the amplitude limitation unit 43, and the multiplier 44. The edge enhancement unit 62 includes the brightness level determination unit 54, the selector 55, and a parameter adjusting unit 63.

The parameter adjusting unit 63 adjusts a noise cancelling threshold value 64, an amplitude limit width 65, and an amplitude adjusting gain 66 depending on the determination result of the brightness level determination unit 54. For example, the edge enhancement unit 62 holds the noise cancelling threshold value 64, the amplitude limit width 65, and the amplitude adjusting gain 66 which are set in advance.

The brightness level determination unit 54 outputs the determination result of the signal level of the Y signal 35 to the selector 55 and the parameter adjusting unit 63. The parameter adjusting unit 63 switches the noise cancelling threshold value 64, the amplitude limit width 65, and the amplitude adjusting gain 66, for example, according to the case where the signal level of the Y signal 35 is less than d1, the case of being equal to or higher than d1 and less than d2, and the case of being equal to or higher than d2, respectively. The parameter adjusting unit 63, for example, multiplies a coefficient by each of the noise cancelling threshold value 64, the amplitude limit width 65, and the amplitude adjusting gain 66 which are set in advance, so that the noise cancelling threshold value 64, the amplitude limit width 65, and the amplitude adjusting gain 66 are adjusted. The coefficient, for example, is a value ranging from 0 to 1.

The parameter adjusting unit 63 adjusts the noise cancelling threshold value 64 to have a lower value as the signal level of the Y signal 35 increases such as "less than d1", "equal to or higher than d1 and less than d2", and "equal to or higher than d2". Therefore, the noise in the dark part is reduced, and the sufficient edge enhancement can be made in the bright part.

The parameter adjusting unit 63 adjusts the amplitude limit width 65 to have a lower value as the signal level of the Y signal 35 decreases such as "equal to or higher than d2", "equal to or higher than d1 and less than d2", and "less than d1". Therefore, the noise in the dark part is reduced, and the sufficient edge enhancement can be made in the bright part.

The parameter adjusting unit 63 adjusts the amplitude adjusting gain 66 to have a lower value as the signal level of the Y signal 35 decreases such as "equal to or higher than d2", "equal to or higher than d1 and less than d2", and "less than d1". Therefore, the noise in the dark part is reduced, and the sufficient edge enhancement can be made in the bright part.

The noise cancellation unit 42 performs the noise cancellation process in which the noise cancelling threshold value 64 received from the parameter adjusting unit 63 is used. The amplitude limitation unit 43 performs the amplitude limitation process in which the amplitude limit width 65 received from the parameter adjusting unit 63 is used. The multiplier 44 performs the amplitude adjustment in which the amplitude adjusting gain 66 received from the parameter adjusting unit 63 is used.

Even in the DSP 60 according to the second embodiment, similarly to the case in the first embodiment, the edge enhancement and the noise suppression can be effectively performed and a high-quality image can be obtained. In the embodiment, the DSP 60 adjusts the respective parameters in the noise cancellation process, the amplitude limitation process, and the amplitude adjustment according to the height of the brightness level to perform the edge extraction, so that the edge enhancement and the noise suppression can be more effectively realized.

The coefficient which is multiplied by the noise cancelling threshold value 64, the amplitude limit width 65, and the amplitude adjusting gain 66 is not limited to the case of a constant value. The coefficient, for example, may be changed in conjunction with the analog gain which is used for capturing the object image in the image sensor 12 (see FIG. 2). Therefore, the DSP 60 can optimally realize the edge enhancement and the noise suppression according to the brightness at the time of capturing.

The parameter adjusting unit 63 is not limited to the case of adjusting all the noise cancelling threshold value 64, the amplitude limit width 65, and the amplitude adjusting gain 66. The parameter adjusting unit 63 may adjust at least any one of the noise cancelling threshold value 64, the amplitude limit width 65, and the amplitude adjusting gain 66.

The parameter adjusting unit 63 is not limited to the case of being assembled into the edge enhancement unit 62. The parameter adjusting unit 63, for example, may be assembled into the edge extraction unit 61. The DSP 60 may include the parameter adjusting unit 63 in neither the edge enhancement unit 62 nor the edge extraction unit 61.

Figure 16:
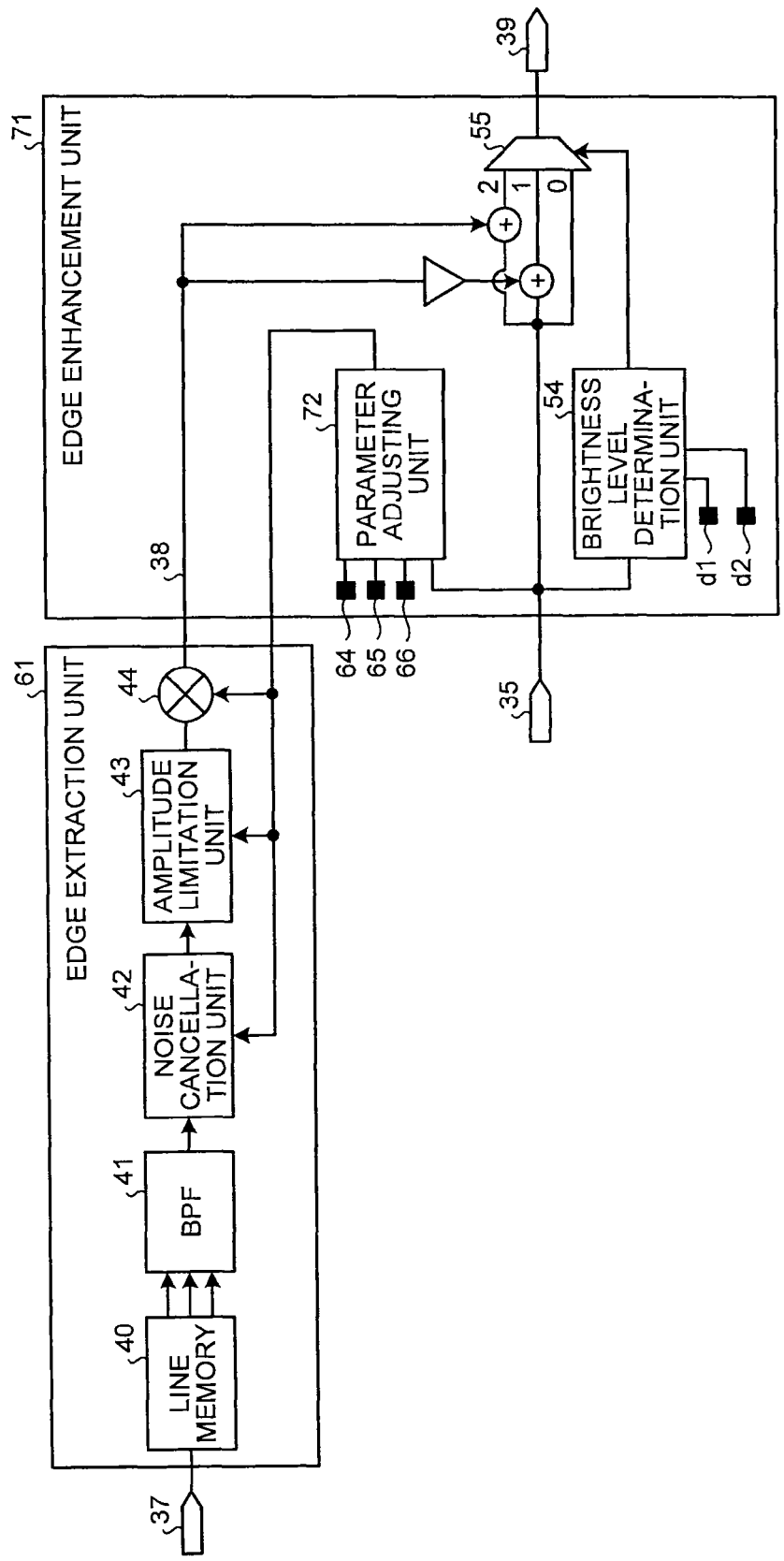
FIG. 16 is a block diagram illustrating configurations of an edge extraction unit and an edge enhancement unit, which are included in a DSP serving as an image processing device according to a third embodiment.

FIG. 16 is a block diagram illustrating configurations of an edge extraction unit and an edge enhancement unit in a DSP serving as an image processing device according to a third embodiment. An edge enhancement unit 71 is employed instead of the edge enhancement unit 62 (see FIG. 14) in the second embodiment. The same components as those of the first and second embodiments are denoted by the same reference numerals, and the redundant descriptions will not be repeated.

The edge enhancement unit 71 includes the brightness level determination unit 54, the selector 55, and a parameter adjusting unit 72. The parameter adjusting unit 72 changes the noise cancelling threshold value 64, the amplitude limit width 65, and the amplitude adjusting gain 66 in conjunction with the signal level of the Y signal 35. The parameter adjusting unit 72 assumes that the noise cancelling threshold value 64, the amplitude limit width 65, and the amplitude adjusting gain 66 are in a relation of linear functions, for example, with respect to the signal level of the Y signal 35, and changes each of the noise cancelling threshold value 64, the amplitude limit width 65, and the amplitude adjusting gain 66. The parameter adjusting unit 72 may assume that the noise cancelling threshold value 64, the amplitude limit width 65, and the amplitude adjusting gain 66 are in a relation of non-linear functions with respect to the signal level of the Y signal 35, and change each of the noise cancelling threshold value 64, the amplitude limit width 65, and the amplitude adjusting gain 66.

As the signal level of the Y signal 35 increases, the parameter adjusting unit 72 adjusts the noise cancelling threshold value 64 such that the noise cancelling threshold value 64 becomes a low value. As the signal level of the Y signal 35 decreases, the parameter adjusting unit 72 adjusts the amplitude limit width 65 such that the amplitude limit width 65 becomes a low value. As the signal level of the Y signal 35 decreases, the parameter adjusting unit 72 adjusts the amplitude adjusting gain 66 such that the amplitude adjusting gain 66 becomes a low value.

The noise cancellation unit 42 performs the noise cancellation process in which the noise cancelling threshold value 64 received from the parameter adjusting unit 72 is used. The amplitude limitation unit 43 performs the amplitude limitation process in which the amplitude limit width 65 received from the parameter adjusting unit 72 is used. The multiplier 44 performs the amplitude adjustment in which the amplitude adjusting gain 66 received from the parameter adjusting unit 72 is used.

Even in the DSP according to the third embodiment, similarly to the case in the first embodiment, the edge enhancement and the noise suppression can be effectively performed and a high-quality image can be obtained. In the embodiment, the DSP adjusts the respective parameters in the noise cancellation process, the amplitude limitation process, and the amplitude adjustment according to the height of the brightness level to perform the edge extraction, so that the edge enhancement and the noise suppression can be more effectively realized.

The parameter adjusting unit 72 is not limited to the case of adjusting all the noise cancelling threshold value 64, the amplitude limit width 65, and the amplitude adjusting gain 66. The parameter adjusting unit 72 may adjust at least any one of the noise cancelling threshold value 64, the amplitude limit width 65, and the amplitude adjusting gain 66.

The parameter adjusting unit 72 is not limited to the case of being assembled into the edge enhancement unit 71. The parameter adjusting unit 72, for example, may be assembled into the edge extraction unit 61. The DSP may include the parameter adjusting unit 72 in neither the edge enhancement unit 71 nor the edge extraction unit 61.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
    a data extraction unit which performs data extraction according to a signal level from an image signal acquired by capturing an object image;
    a noise cancellation unit which performs a noise cancellation process on extraction data extracted by the data extraction unit;
    an amplitude limitation unit which performs an amplitude limitation process on the extraction data;
    an edge enhancement unit which performs an edge enhancement process on a brightness signal by adding the extraction data subjected to the noise cancellation process and the amplitude limitation process to the brightness signal obtained from the image signal; and
    a brightness level determination unit which determines a height of the signal level of the brightness signal,
    wherein the edge enhancement unit adjusts a signal level of the extraction data added to the brightness signal depending on a determination result of the brightness level determination unit.

2. The image processing device according to claim 1, wherein the edge enhancement unit adjusts the extraction data using a coefficient which is selected depending on the determination result of the brightness level determination unit.

3. The image processing device according to claim 2, wherein the edge enhancement unit changes the coefficient in conjunction with an analog gain used for capturing the object image.

4. The image processing device according to claim 1, further comprising
    an amplitude adjusting unit which performs amplitude adjustment on the extraction data which has been subjected to the amplitude limitation process.

5. The image processing device according to claim 4, further comprising a parameter adjusting unit which adjusts an amplitude adjusting gain set for the amplitude adjustment depending on the determination result of the brightness level determination unit.

6. The image processing device according to claim 5, wherein the parameter adjusting unit changes the amplitude adjusting gain in conjunction with the signal level of the brightness signal.

7. The image processing device according to claim 1, further comprising
    a parameter adjusting unit which adjusts a noise cancelling threshold value set for the noise cancellation process depending on the determination result of the brightness level determination unit.

8. The image processing device according to claim 7, wherein the parameter adjusting unit changes the noise cancelling threshold value in conjunction with the signal level of the brightness signal.

9. The image processing device according to claim 1, further comprising
    a parameter adjusting unit which adjusts an amplitude limit width set for the amplitude limitation process depending on the determination result of the brightness level determination unit.

10. The image processing device according to claim 9, wherein the parameter adjusting unit changes the amplitude limit width in conjunction with the signal level of the brightness signal.

11. An image processing method comprising:
    performing data extraction according to a signal level from an image signal acquired by capturing an object image;
    performing a noise cancellation process on the extraction data which is extracted by the data extraction;
    performing an amplitude limitation process on the extraction data;
    performing an edge enhancement process on a brightness signal by adding the extraction data which has been subjected to the noise cancellation process and the amplitude limitation process to the brightness signal obtained from the image signal; and
    performing brightness level determination in which a height of the signal level of the brightness signal is determined,
    wherein the signal level of the extraction data added to the brightness signal in the edge enhancement process is adjusted depending on a result of the brightness level determination.

12. The image processing method according to claim 11, wherein a coefficient selected depending on the result of the brightness level determination is used for adjusting a signal level of the extraction data in the edge enhancement process.

13. The image processing method according to claim 12, wherein the coefficient is changed in conjunction with an analog gain used for capturing the object image.

14. The image processing method according to claim 11, wherein amplitude adjustment is further performed on the extraction data which has been subjected to the amplitude limitation process.

15. The image processing method according to claim 14, wherein parameter adjustment is further performed in which an amplitude adjusting gain set for the amplitude adjustment is adjusted depending on the result of the brightness level determination.

16. The image processing method according to claim 15, wherein the amplitude adjusting gain is changed in the parameter adjustment in conjunction with the signal level of the brightness signal.

17. The image processing method according to claim 11, wherein parameter adjustment is further performed in which at least any one of a noise cancelling threshold value set for the noise cancellation process and an amplitude limit width set for the amplitude limitation process is adjusted depending on the result of the brightness level determination.

18. The image processing method according to claim 17, wherein at least any one of the noise cancelling threshold value and the amplitude limit width is changed in the parameter adjustment in conjunction with the signal level of the brightness signal.

19. A camera module comprising:

a lens unit which receives light from an object to form an object image;

an image sensor which captures the object image and generates an image signal; and an image processing device which performs signal processing on the image signal, wherein the image processing device includes a data extraction unit which performs data extraction according to a signal level from the image signal, a noise cancellation unit which performs a noise cancellation process on extraction data extracted by the data extraction unit, an amplitude limitation unit which performs an amplitude limitation process on the extraction data, an edge enhancement unit which performs an edge enhancement process on a brightness signal by adding the extraction data subjected to the noise cancellation process and the amplitude limitation process to the brightness signal obtained from the image signal, and a brightness level determination unit which determines a height of the signal level of the brightness signal, and wherein the edge enhancement unit adjusts a signal level of the extraction data added to the brightness signal depending on a determination result of the brightness level determination unit.

20. The camera module according to claim 19, wherein the edge enhancement unit adjusts the extraction data using a coefficient which is selected depending on the determination result of the brightness level determination unit, and the coefficient is changed in conjunction with an analog gain used for capturing the object image by the image sensor.

* * * * *